(12) United States Patent
Marty et al.

(10) Patent No.: US 7,888,913 B1
(45) Date of Patent: Feb. 15, 2011

(54) SMART BATTERY CHARGER

(75) Inventors: William A. Marty, Seattle, WA (US);
Dean Jeffrey Bidwell, Renton, WA (US)

(73) Assignee: Intermec IP Corp., Everett, WA (US)

( * ) Notice: Subject to any disclaimer, the term of this patent is extended or adjusted under 35 U.S.C. 154(b) by 0 days.

(21) Appl. No.: 12/872,877

(22) Filed: Aug. 31, 2010

Related U.S. Application Data

(63) Continuation of application No. 61/240,497, filed on Sep. 8, 2009.

(51) Int. Cl.
*H02J 7/00* (2006.01)
(52) U.S. Cl. .................. 320/132; 320/106; 320/115
(58) Field of Classification Search ................ 320/106, 320/115, 132
See application file for complete search history.

(56) References Cited

U.S. PATENT DOCUMENTS

| | | | |
|---|---|---|---|
| 4,218,644 A | 8/1980 | Bourke et al. | |
| 4,743,831 A * | 5/1988 | Young ..................... | 320/127 |
| 5,475,294 A | 12/1995 | Isoda | |
| 5,565,759 A | 10/1996 | Dunstan | |
| 5,714,866 A | 2/1998 | S et al. | |
| 5,717,937 A | 2/1998 | Fritz | |
| 6,194,874 B1 | 2/2001 | Kalogeropoulos et al. | |
| 6,337,560 B1 | 1/2002 | Kalogeropoulos et al. | |
| 6,456,037 B1 | 9/2002 | Jakl et al. | |
| 6,859,012 B2 | 2/2005 | McNeill | |
| 7,191,077 B2 * | 3/2007 | Mese et al. .................... | 702/63 |
| 7,521,893 B2 | 4/2009 | Tsuchiya et al. | |
| 7,528,574 B1 | 5/2009 | Adkins et al. | |
| 7,570,015 B2 * | 8/2009 | Bansal et al. ............... | 320/106 |
| 2004/0160210 A1 | 8/2004 | Bohne et al. | |
| 2005/0285571 A1 | 12/2005 | Grunert et al. | |
| 2007/0188135 A1 | 8/2007 | Odaohhara | |
| 2008/0079397 A1 | 4/2008 | Fee et al. | |
| 2008/0174263 A1 | 7/2008 | Ghode et al. | |

OTHER PUBLICATIONS

F.Lima, J.N. Ramalho, D. Tavares, J.Durarte, C.Albuquerque, T.Marques, A.Geraldes, A.P.Casimiro Chipidea, Microelectronica S.A.; floriberto.lima@chipidea.com; G.Renkema, J.Been, W.Groeneveld Philips Semiconductors. BVgert.renkema@philips.com "A Novel Universal Battery Charger for NiCd, NiMH, Li-ion and Li-polymer." This paper appears in: Solid-State Circuits Conference, 2003. ESSCIRC '03. Proceedings of the 29th EuropeanPublication Date: Sep. 16-18, 2003 on p. 209-212.
PCT Notification of Transmittal of the International Search Report and the Written Opinion of the International Searching Authority, or the Declaration, Date of Mailing: Oct. 29, 2010, International application No. PCT/US2010/047685, Applicant: Intermec IP Corp.

* cited by examiner

*Primary Examiner*—Edward Tso
*Assistant Examiner*—Richard V Muralidar
(74) *Attorney, Agent, or Firm*—Shook, Hardy & Bacon L.L.P.

(57) ABSTRACT

A smart battery charger is provided that includes one or more sensors to identify a particular battery, generate a usage profile for the battery over time, and develop a charging strategy that maximizes the useful life of the battery. The useful life of the battery may be maximized by minimizing the charge on the battery over the course of the battery's life. The charge may be minimized by delayed charging and undercharging.

20 Claims, 7 Drawing Sheets

SMART BATTERY CHARGER

RELATED APPLICATIONS

This application claims priority to U.S. Provisional Application Ser. No. 61/240,497, filed on Sep. 8, 2009, which application is hereby incorporated by reference.

SUMMARY

Embodiments of the invention are defined by the claims below, not this summary. A high-level overview of various aspects of embodiments of the invention are provided here for that reason, to provide an overview of the disclosure and to introduce a selection of concepts that are further described below in the detailed-description section. This summary is not intended to identify key features or essential features of the claimed subject matter, nor is it intended to be used as an aid in isolation to determine the scope of the claimed subject matter.

Embodiments of the present invention relate generally to a system, method, and/or apparatus for managing the charge on a battery over the battery's life in order to maximize the useful life of the battery. The useful life of many types of batteries may be extended by minimizing the total charge on the battery over the life of the battery. The total charge may be minimized by delaying the initiation of the charge cycle so that it is completed immediately before the battery is used. The total charge in the battery over its life may also be reduced by charging the battery to less than its maximum capacity during a charge cycle. Embodiments of the present invention may use both of these mechanisms and others to minimize the charge on the battery over the battery's life.

BRIEF DESCRIPTION OF THE SEVERAL VIEWS OF THE DRAWINGS

Illustrative embodiments of the present invention are described in detail below with reference to the included drawing figures, wherein.

DETAILED DESCRIPTION

Embodiments of the present invention relate generally to a system, method, and/or apparatus for managing battery charge cycles in order to maximize the useful life of one or more batteries. The useful life of many types of batteries may be extended by minimizing the total charge on the battery over the life of the battery. The total charge may be minimized by delaying the initiation of the charge cycle so that it is completed immediately before the battery is used. The total charge in the battery over its life may also be reduced by charging the battery to less than its maximum capacity during a charge cycle. Embodiments of the present invention may use both of these mechanisms and others to minimize the charge on the battery over the battery's life.

In one embodiment, the battery's charge cycles are managed by a smart battery charger. The smart battery charger identifies a particular battery and associates the particular battery with a usage history. The usage history may be stored on the battery charger or in memory that is part of the battery. In another embodiment, the charge cycles are managed by a device utilizing the battery, such as a laptop computer, a cell phone, a PDA, a power tool, a hand-held scanner, or other device.

Embodiments of the present invention may utilize one or more computer-storage media with computer-executable instructions or computer-readable data embodied thereon. Computer-storage media include both volatile and nonvolatile media, removable and nonremovable media, and contemplate media readable by a database, a switch, and various other network devices. The computer-storage media is non-transitory. By way of example, and not limitation, computer-storage media comprise media implemented in any method or technology for storing information. Examples of stored information include computer-useable instructions, data structures, program modules, and other data presentations. Media examples include, but are not limited to, information-delivery media, RAM, ROM, EEPROM, flash memory or other memory technology, CD-ROM, digital versatile discs ("DVD"), holographic media or other optical disc storage, magnetic cassettes, magnetic tape, magnetic disk storage, and other magnetic storage devices. These technologies can store data momentarily, temporarily, or permanently.

Figure 1:
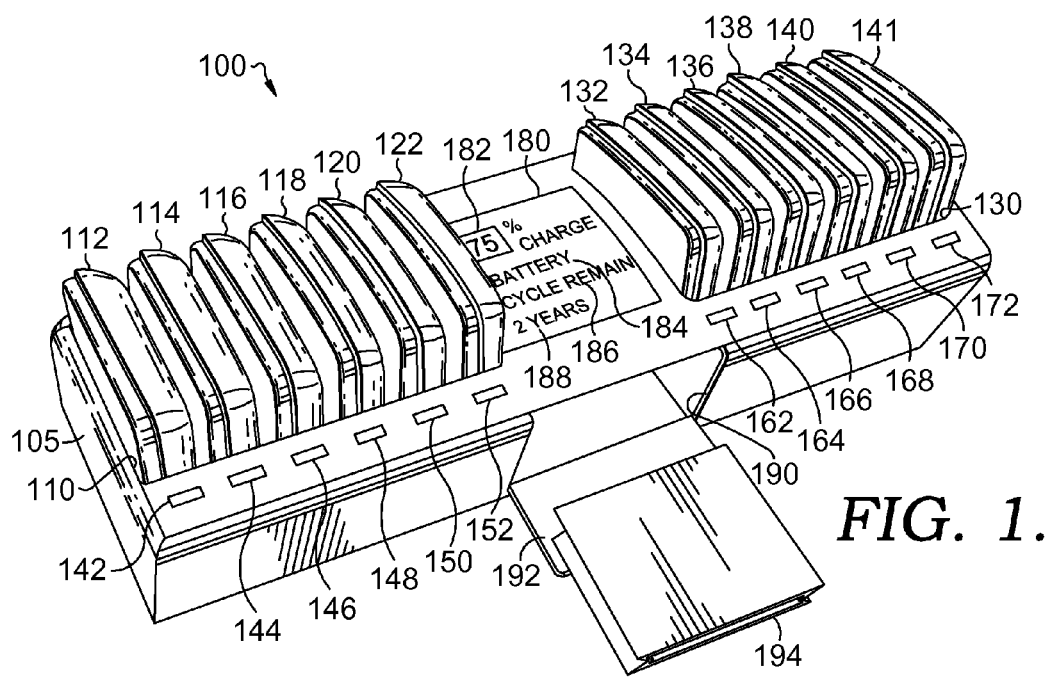
FIG. 1 is a diagram showing a smart battery charger suitable for managing charge cycles on a plurality of batteries in order to prolong the operational life of the batteries, in accordance with an embodiment of the present invention.

Turning now to FIG. 1, a smart battery charger 100 suitable for managing charge cycles on a plurality of batteries in order to prolong the operation life of the batteries is shown, in accordance with an embodiment of the present invention. The smart battery charger 100 includes a body 105 that houses the components of the battery charger 100. The housing may be plastic, metal, aluminum, or other suitable material. The battery charger 100 includes charging port 110 and charging port 130. The charging port 110 is shown with battery 112, battery 114, battery 116, battery 118, battery 120, and battery 122. The charging port 130 is shown with battery 132, battery 134, battery 136, battery 138, battery 140, and battery 141. As can be seen, each charging port holds six batteries. Embodiments of the present invention are not limited to charging ports that hold six batteries. For example, an exemplary battery charger may include just a single charging port. The charging port 110 and the charging port 130 are sized and shaped to receive one or more batteries. Though not shown in FIG. 1, each battery port includes a charging plug that couples with a charging port on the battery. The charging plug and the charging port couple to enable an electrical current to pass between the battery charger 100 and an individual battery placed in the charger.

In one embodiment, charging port 110 and charging port 130 are sized to fit the battery plus the box in which a battery is packaged. Each of the batteries in FIG. 1 is shown outside of a box or casing in which a battery may typically be shipped. In the embodiment where the battery is charged while in a shipping package, the shipping package may have openings that allow access to the charging ports on the battery. The shipping package may also have an opening allowing a communications plug on the battery charger to couple with a communications port on the battery. The communications port allows a computer-storage media in the battery to be accessed by the battery charger when the battery and charger are coupled together.

Charging a battery in a packaging box may be useful to charge the battery immediately prior to shipment to a use point. Thus, in this embodiment, the smart battery charger 100 would be used to charge batteries prior to their first use. The batteries could be left on a shelf within the shipping package uncharged until they are ready to be shipped, at which time they could be placed in the battery charger 100 and charged. The first charge cycle could then be recorded on memory within the battery and then the battery could be shipped to the customer. A battery charger at the point of use could utilize the initial usage and charging information to estimate the future life of the battery more accurately. The battery charger at the point of use may be a different battery charger than the one used prior to shipment.

Charging the battery for the first time as the battery is shipped and on an as-needed basis may benefit warranty programs offered to battery customers. For example, leaving a charged, or partially charged, battery on a shelf prior to shipment to a customer decreases the useful life of the battery. A vendor with inconsistent shelf time may be forced to offer a shorter warranty to avoid warranty claims. However, by starting the "life" of the battery at the time of shipment the predictability of the useful life the battery is increased and a longer warranty may be offered. A warranty could also be based on the total energy delivered by the battery, which is roughly the sum of the amount of energy put into the battery at each charge cycle. Offering a warranty based on total energy delivery may not be possible unless the charge-cycle details are recorded. The total energy used may be recorded in the battery as each charge and use cycle is recorded.

In addition to charging the battery while in a shipping box or outside of the device in which the battery is used, the battery charger may also couple with the device in which the battery is used. Thus, the battery charger could include a cradle for receiving a device and coupling with the battery in the device for the purpose of charging the battery and exchanging information with the battery. In this case, the ports in the battery couple with plugs in the battery charger via the device in which the battery is located. Thus, the plugs in the battery and the ports in the battery charger may not be in direct contact with each other. As used throughout the present application, communicatively coupling occurs when a communication is passed from the charger to the battery or from the battery to the charger. Multiple conduits and devices may carry the communication between the battery and the charger. The charger and battery do not need to be in direct contact even when a plug on the battery is described as coupling with a port on the battery charger or vice versa. Similarly, a conductive couple occurs when an electrical current is able to pass between the battery and the charger. Multiple conduits and devices may carry the current. The charger and battery do not need to be in direct contact for a conductive coupling to occur even when a plug on the battery is described as coupling with a socket on the battery charger or vice versa. In another embodiment, the battery charger connects to the device and the battery in the device through one or more cables.

Continuing now with FIG. 1, the body 105 of the battery charger 100 defines an opening 190 into which battery packaging may be stored. As can be seen, battery packaging 194 may be collapsed and placed into the opening. A door 192 may cover the opening 190 and secure the battery packaging within the body 105. Storing a battery packaging 194 within the battery charger facilitates recycling the battery at the end of the battery's useful life by making a return package readily accessible to the user of the battery.

The battery charger 100 includes a display 180. The display 180 may display information related to one or more batteries within the battery charger 100. For example, the display 180 may display the percent charged 182 for a particular battery, an identifier 184 for the particular battery, the current charge cycle 186 for the particular battery, and the remaining estimated life 188 of the particular battery. The remaining life may be determined by calculating how long it will take for the remaining usage cycles to be used if the present usage pattern for the battery continues into the future. The remaining usage cycles may be calculated by subtracting the total cycles on the battery to date from the expected lifetime charge cycles. The information for an individual battery may be accessed by pushing a button adjacent to a battery. For example, the information related to battery 112 may be accessed by pushing the button 142. Similarly, buttons 144, 146, 148, 150, 152, 162, 164, 166, 168, 170, and 172 may be pushed to access information related to the batteries adjacent to the respective buttons. The display 180 may be an LCD display, touch-screen display, or other suitable display type. Other buttons (not shown) may allow the user to navigate menu options presented on the display 180.

Figure 2:
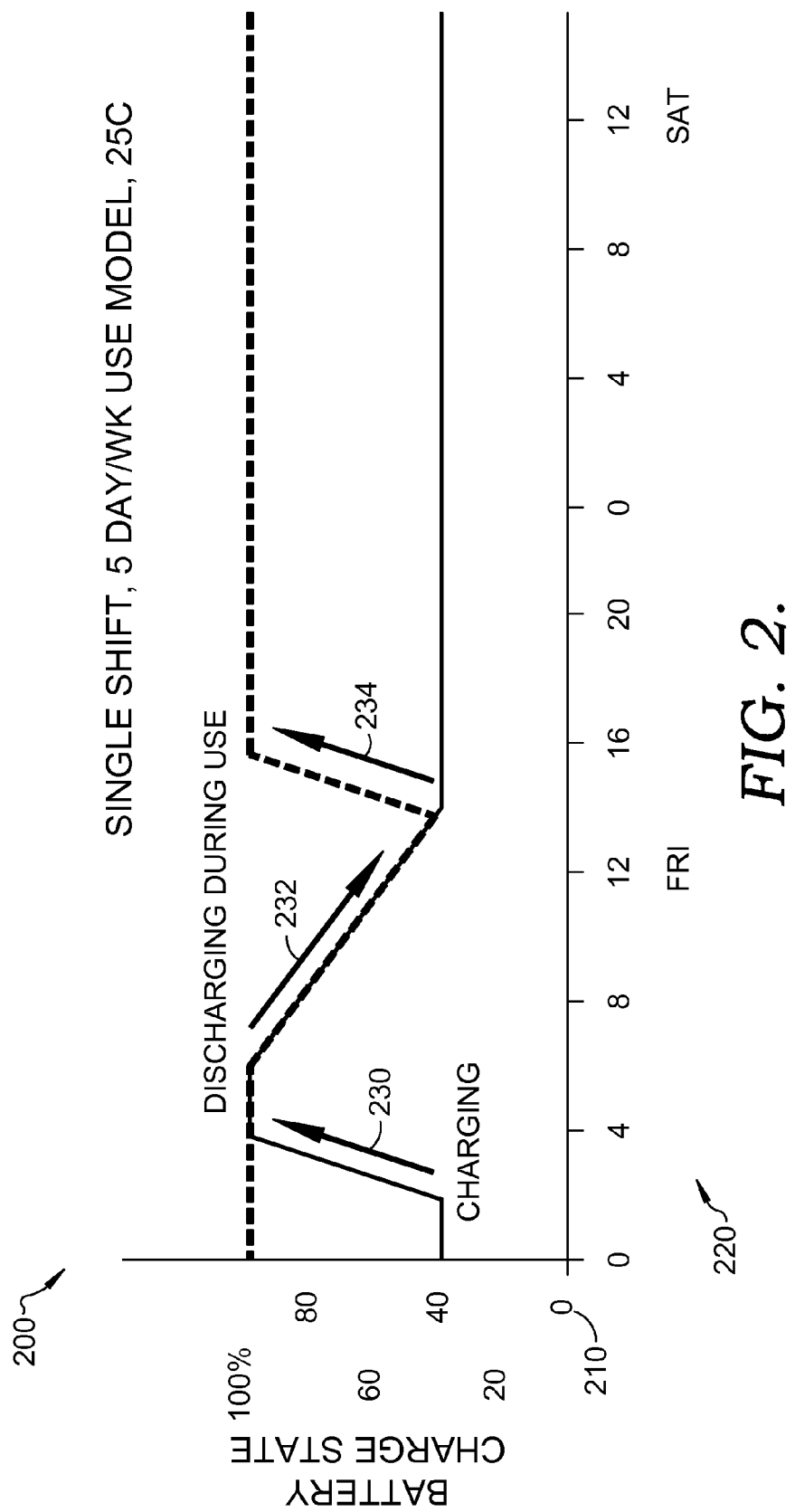
FIG. 2 is a line graph illustrating a usage history for a battery over the course of a five-day workweek, in accordance with an embodiment of the present invention.
Figure 2:
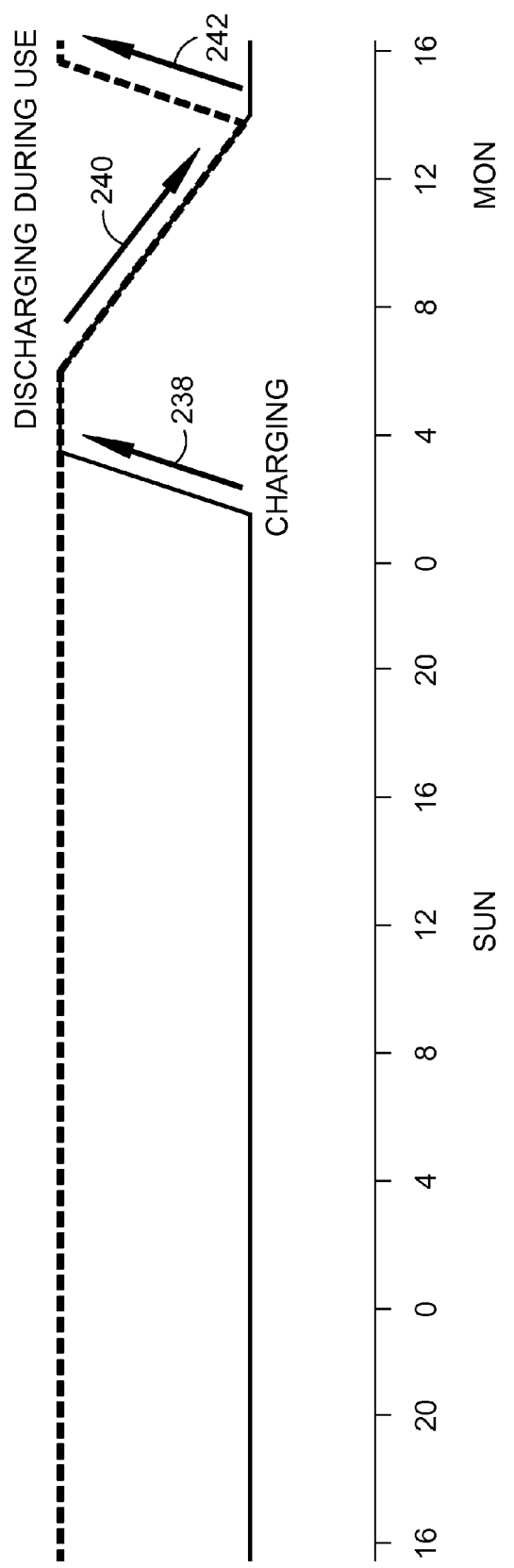
Figure 2:
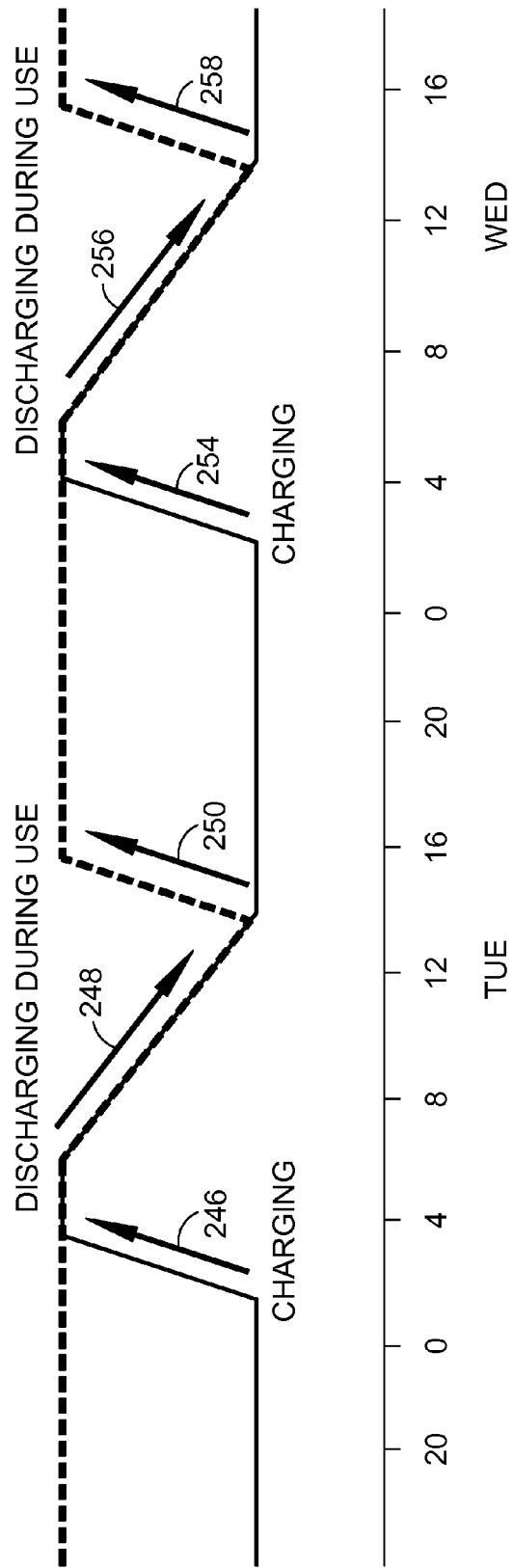
Figure 2:
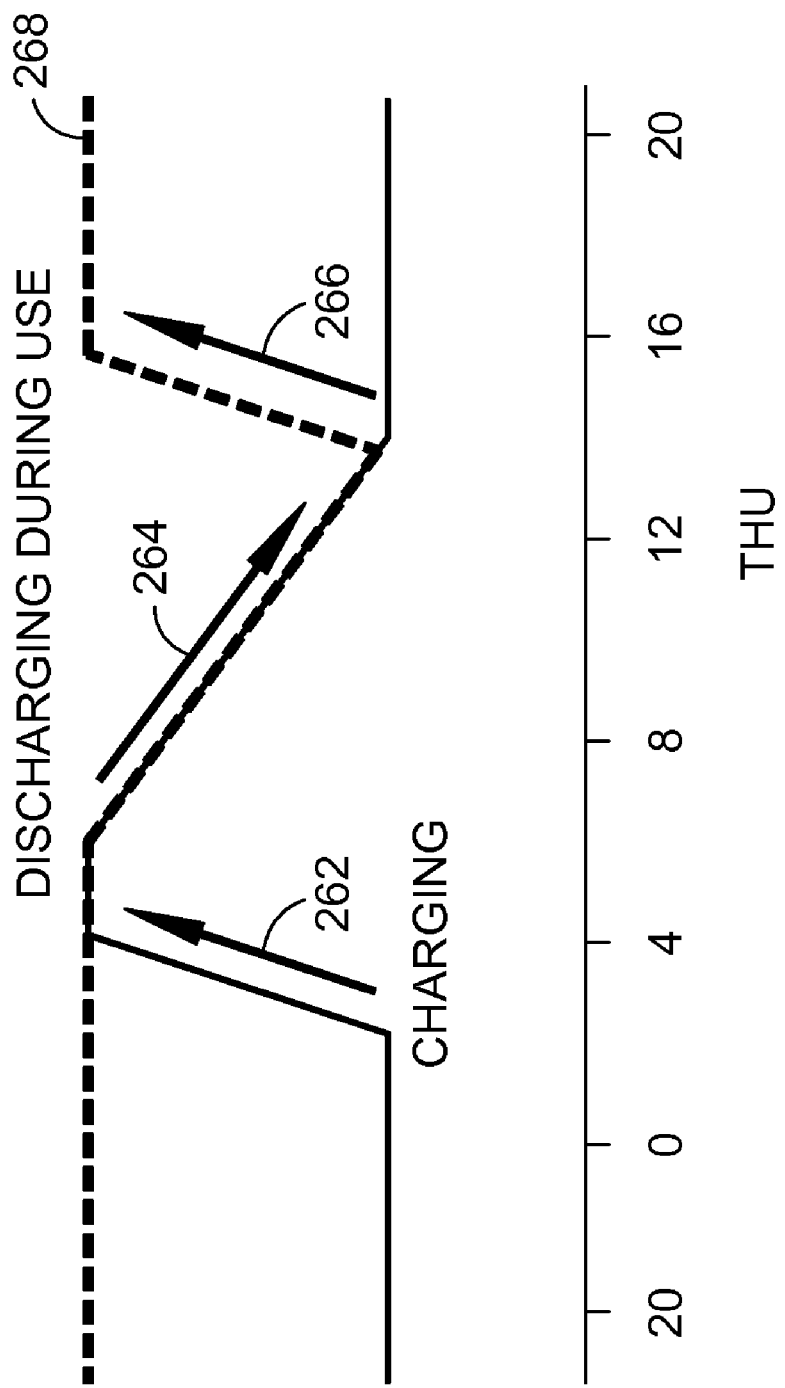

Turning now to FIG. 2, a line graph illustrating a usage history for a battery over the course of a five-day workweek is shown according to an embodiment of the present invention. The Y axis 210 shows the charge percent on the battery. The X axis 220 shows the time and day. The solid line indicates smart charging on an as-needed basis in accordance with an embodiment of the present invention. The dash line indicates traditional charging which begins soon after the battery is placed in the battery charger. Under the smart charging regime, on Friday, from approximately 2:00 A.M. to 5:00 AM, the battery is charged 230 from 40 to 100% of capacity. At approximately 6:00 AM to about 2:00 PM on Friday, the battery is discharged 232 during use. As can be seen, the discharge cycle will be similar for both the traditional and smart charge cycles. As the battery ages, the discharge cycle may differ significantly for batteries charged under the traditional and smart charge cycles. Under the traditional regime, charging 234 begins immediately upon the battery being placed in the battery charger at roughly 2:00 PM on Friday. In contrast, under the smart charging, the charging 238 does not begin until about 2:00 AM on Monday. This allows the battery to remain at about 40% charge capacity for an additional two days. The initiation of charging 238 begins with enough time to complete the charge cycle prior to the anticipated next usage at about 6:00 AM on Monday. The anticipated next usage may be determined based on previous usage cycles recorded for the battery. Viewing the entire line graph 200, it can be seen, for example, that the usage cycle typically begins at about 6:00 AM on weekdays and concludes at 2:00 PM after an eight hour shift. Embodiments of the present invention are not limited for use with batteries having a particular use/charge cycle. Thus, the initiation of charging under a smart regime may begin with enough time to be completed before 6:00 AM. In FIG. 2, the smart charge cycles are completed at 5:00 AM, which is one hour before the battery's anticipated usage.

Continuing with FIG. 2, once again at about 6:00 AM, the battery begins to discharge 240 until it reaches 40% capacity around noon on Monday. Again, under the traditional regime, the battery would initially begin charging 242 to full capacity at about 2:00 PM on Monday. In contrast, by waiting until just before the battery would actually be used, charging 246 may begin at about 2:00 AM on Tuesday. This cycle essentially repeats each day on the remaining graph.

From roughly 6:00 AM until 2:00 PM on Tuesday, the battery discharges 248 as it is used. Under the traditional regime, the battery is charged 250 at roughly 2:00 PM. In contrast, under the smart regime the battery is charged 254 at roughly 2:00 AM on Wednesday. On Wednesday, the battery discharges 256 during use. Under the traditional regime, the battery is charged 258 at 2:00 PM on Wednesday. Under the smart regime the battery is charged 262 at 2:00 AM the following day on Thursday. The final use cycle occurs on Thursday when the battery is discharged 264. One final charge 266 under the traditional regime is shown. For the one-week period of time shown in FIG. 2, the battery charged under the traditional regime averages 91% charged. In contrast, the battery charged under the smart regime averages 53% charged. This difference may significantly extend the useful life of the battery.

Figure 3:
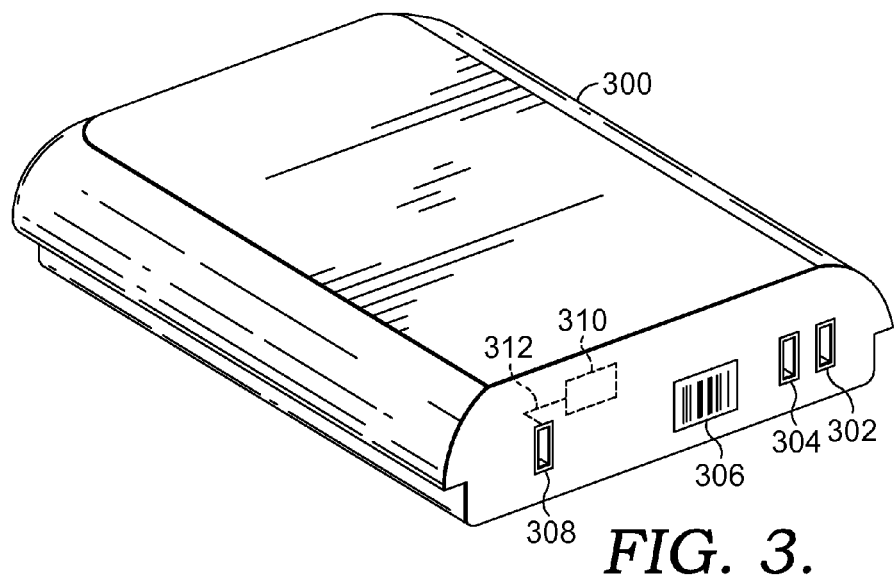
FIG. 3 is a diagram of an exemplary battery for use in embodiments of the present invention.

Turning now to FIG. 3, an exemplary battery 300 for use in embodiments of the present invention is shown. The battery 300 includes a first charging port 302 and a second charging port 304. The first and second charging ports 302 and 304 are sized and shaped to receive a charging plug from a battery charger. In one embodiment, the first and second charging ports 302 and 304 are simply exposed conductive contacts for contacting charging plugs on the battery charger. The first charging port 302 and the second charging port 304 are coupled to a wire or conduit that carries an electrical charge from the battery charger to the portion of the battery that holds the charge. In one embodiment, the battery 300 is a lithium ion battery. However, embodiments of the present invention are not limited to use with a particular type of battery.

The battery 300 includes an identification 306. In one embodiment, the identification 306 is a bar code. The bar code may be read by a scanner on the battery charger or other device to identify an individual battery and distinguish batteries from each other. In another embodiment, the identification 306 is an RFID tag that could similarly communicate a unique identification number to an appropriately equipped device or battery charger. Identifying a particular battery is important for embodiments of the present invention to associate the batteries with a specific usage history, especially if the usage history is not stored on the battery.

In one embodiment, the usage history for the battery 300 is stored on a computer-readable media 310 within the battery. The media 310 may be accessed by communications port 308. Communications port 308 is conductively coupled to the media 310 by a conduit 312. The communications port 308 may interface with a plug on a battery charger or other device. In one embodiment, the media 310 also includes a unique identifier that is used by a battery charger or other device to identify a specific battery.

Figure 4:
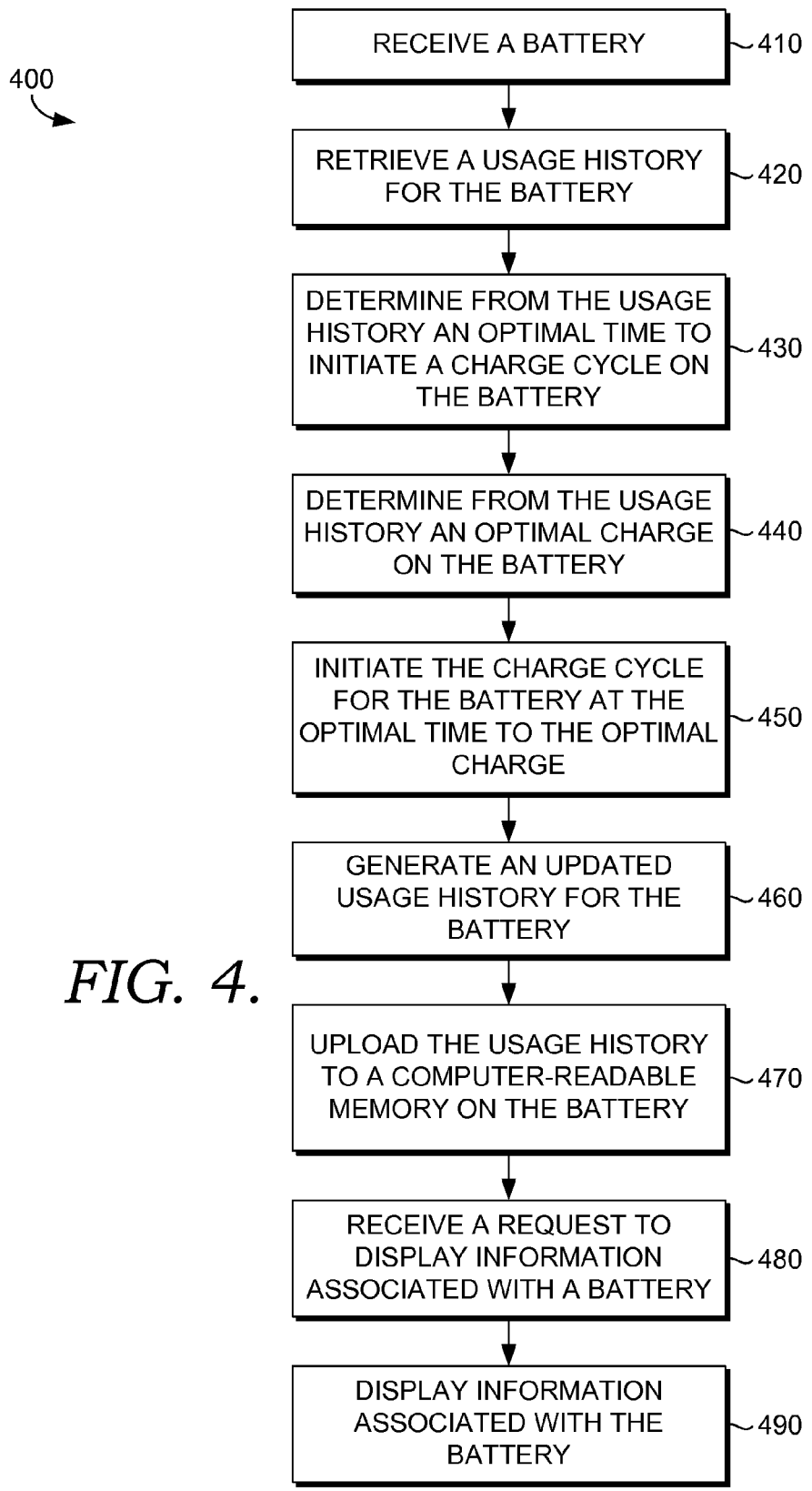
FIG. 4 is a flow chart showing a method of charging a battery, in accordance with an embodiment of the present invention.

Turning now to FIG. 4, a method 400 of charging a battery is shown, in accordance with an embodiment of the present invention. As described previously, the method may be used on any battery that benefits from having a lower charge on the battery over the life of the battery. The primary benefit is extending the useful life of the battery. Extension of the useful life of the battery may be evidenced by enabling the battery to be charged for additional cycles. A charge cycle consists of discharging the charge on the battery and recharging the battery to either full or less than full capacity. Extension of the useful life of the battery may also be evidenced by the battery holding a full charge for additional charge cycles or any other measure by which the battery remains valuable to the user for a longer period of time.

At step 410, a battery is received. In one embodiment, the battery is received by placing the battery into a charging port on a battery charger. In another embodiment, the battery may be received by a device that uses the battery.

At step 420, a usage history for the battery is retrieved. In one embodiment, the usage history is retrieved from computer-readable memory or storage located in the battery. In another embodiment, the usage history for the battery is stored on the battery charger or device utilizing the battery. When the usage history is stored in a location other than in the battery, the individual battery may be identified by a unique identifier, such as a bar code or RFID tag or other mechanism. The usage history includes the charge on the battery over time. Thus, the characteristics of a discharge cycle or a charge cycle may be determined from the usage history on the battery. The characteristics of interest include the beginning and end time for the discharge cycle and the energy used during a charge cycle. In one embodiment, the usage history may indicate that the battery has never been charged before.

At step 430, an optimal time to initiate a charge cycle on the battery is determined from the usage history. The optimal time is a time when the battery is likely to be next used minus a period of time required to complete the charge cycle. As illustrated previously in FIG. 2, if the next use cycle is to begin at about 5 o'clock and the charge cycle takes an hour to complete, then the optimal time to initiate a charge cycle on the battery would be roughly 4 o'clock. In one embodiment, a time buffer may be used to ensure that the charge cycle is completed in time for the next use cycle to begin. The buffer is illustrated by about a two-hour time period in FIG. 2. Embodiments of the present invention are not limited to including a buffer. In one embodiment, the usage history is evaluated by a machine-learning algorithm that determines the optimal time.

At step 440, the optimal charge on the battery is determined from the usage history for the battery. The optimal charge is a minimum charge plus an amount of energy historically used during a single use cycle. For example, if 50% of the battery's capacity is typically used during a single-use cycle and the minimum charge is 20%, then the optimal charge on the battery would be 70%. Charging the battery to the optimal charge reduces the total charge on the battery over the life of the battery. In one embodiment, an additional buffer is added to the minimum charge and the amount of energy historically used during a single cycle to calculate the optimal charge. At step 450, a charge cycle is initiated at the optimal time, and the battery is charged during the charge cycle to the optimal charge.

At step 460, an updated usage history is generated based on the recent charging of the battery. At step 470, the updated usage history is uploaded to a computer-readable media on the battery. In this case, the previously retrieved usage history would have been retrieved from the same computer-readable media on the battery. As stated previously, embodiments of the present invention are not limited to storing the battery usage data on the battery. The updated usage history may be stored on the battery charger or use device with the other usage history.

At step 480, a request to display information related to the battery is received. In one embodiment, the request is received by pushing a button adjacent to the battery in a battery charger. In another embodiment, the request is received when a user makes the request through a user interface on the device in which the battery is used. At step 490, the information associated with the battery is displayed. The information includes the usage history, charge cycles on the battery to date, anticipated charge cycles left over the life of the battery, and anticipated energy delivery remaining in the battery. The anticipated energy delivery remaining in the battery is the rated-energy-delivery capacity of the battery minus the total energy delivered by the battery. The total energy delivered by the battery may be calculated by totaling the energy delivered in each charge cycle. The energy delivered during each charge cycle may be recorded on the battery memory or in memory in the battery charger. The rated-energy-delivery capacity may also be stored on the battery memory by a manufacture, vendor, or the battery charger.

In one embodiment, if the usage history indicates that the battery has never been charged, a first charge amount is retrieved from memory in the device using the battery or a battery charger charging a battery for the first time. A usage history is then created and stored where appropriate based on the setup.

Figure 5:
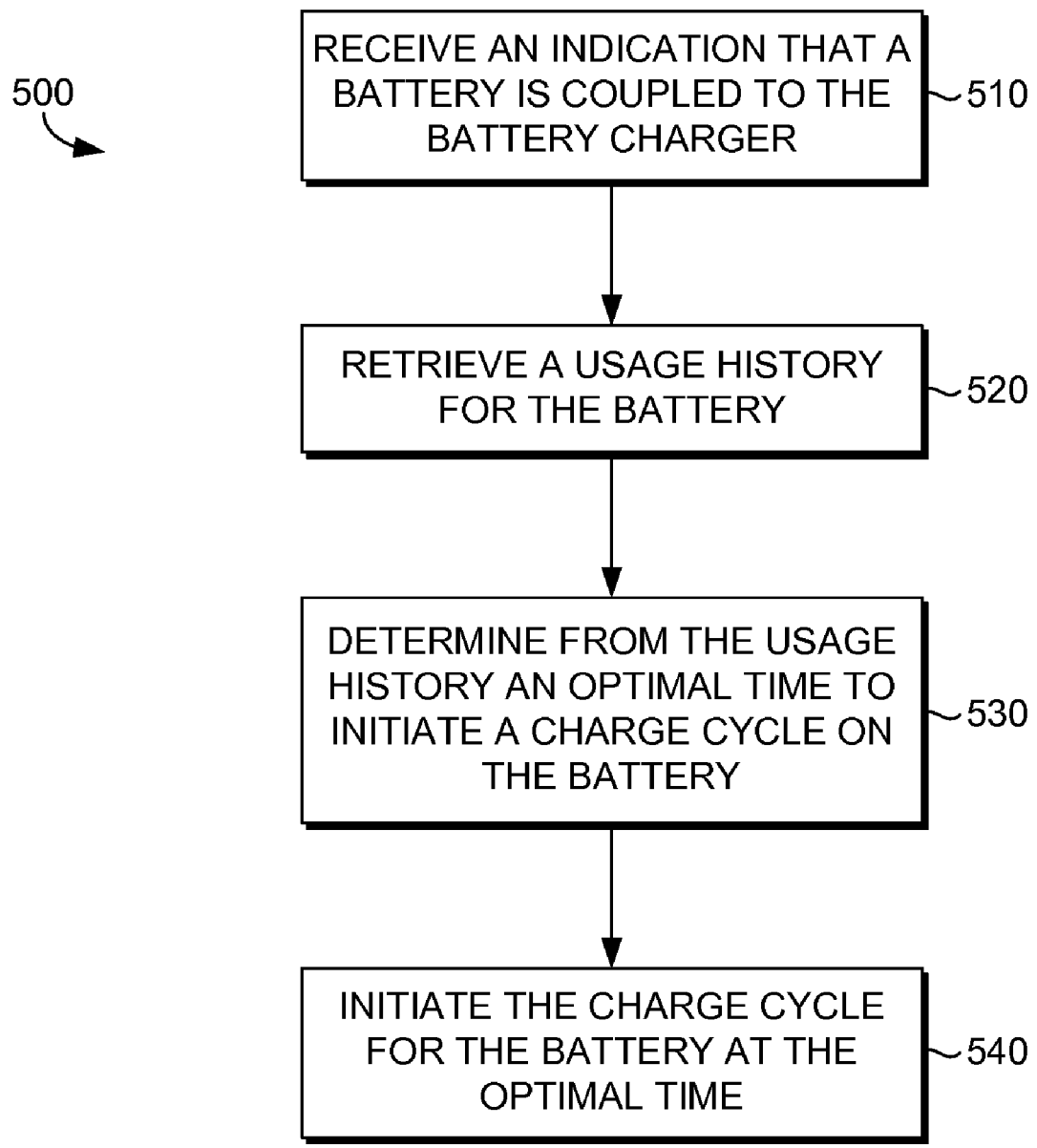
FIG. 5 is a flow chart showing a method of scheduling charge cycles for a battery in order to minimize an average charge on the battery over the life of the battery, in accordance with an embodiment of the present invention.

Turning now to FIG. 5, a method 500 of scheduling charge cycles for a battery in order to minimize an average charge on the battery over the life of the battery is shown, in accordance with an embodiment of the present invention. Method 500 may be used to manage one or a plurality of batteries. At step 510, an indication that a battery is coupled to the battery charger is received. This indication may be generated when a sensor in the battery charger detects the insertion of a battery. In one embodiment, the coupling of a charging port or a communications port in the battery with a charging plug or communications plug in the battery charger may serve as the indication that a battery has been coupled to the battery charger. Though described as a plug in a port, the plugs and ports may simply be contacts suitable for communicating a current between the battery and the battery charger. The port does not need to have a socket into which the plug fits. In another embodiment, a plug is on the battery and a port is in the battery charger. Further, the communications between the battery memory and the battery charger may be wireless. In addition, the charge to the battery could be delivered inductively without use of either a plug or socket in either the battery or the battery charger.

At step 520, a usage history for the battery is retrieved. As described previously, the usage history may be retrieved from memory in the battery charger or from memory located in the battery. At step 530, the usage history is used to determine an optimal time to initiate a charge cycle in the battery. The optimal time is a time when the battery is likely to be next used minus a period of time required to complete the charge cycle for the battery. At step 540, the charge cycle for the battery is initiated at the optimal time. As described previously, the charge cycle may include charging the battery to an optimal charge, which is determined based on the typical battery discharge during a use cycle.

In one embodiment, the battery is just one of a plurality of batteries managed by the battery charger. The plurality of batteries managed by the battery charger may be interchangeable batteries. Interchangeable batteries may be used interchangeably between similar devices compatible with the batteries. In one embodiment, when multiple batteries are managed by the battery charger, one of the plurality of interchangeable batteries is kept as a hot battery. The hot battery is fully charged and available for use outside of the typical or expected usage. In other words the hot battery is not charged based on an optimal time or charge but is fully charged as soon as it is placed in the battery charger. In another embodiment, at least one battery is kept fully charged, but an individual battery is not designated as a hot battery.

In one embodiment, when a plurality of batteries are managed, the charge cycles between the batteries are managed to equalize the life of each battery within the plurality of batteries. The service life of a population of batteries is maximized by equalizing the wear on each battery over time. This may be done by indicating to users of the batteries which batteries should be used first or next. Batteries with less overall usage should be recommended for next use.

Many different arrangements of the various components depicted, as well as components not shown, are possible without departing from the spirit and scope of embodiments of the present invention. Embodiments of the present invention have been described with the intent to be illustrative rather than restrictive. Certain features and subcombinations are of utility and may be employed without reference to other features and subcombinations and are contemplated to be within the scope of the claims.

The invention claimed is:

1. A method of charging a battery comprising:
   retrieving a usage history for the battery;
   determining from the usage history an optimal time to initiate a charge cycle on the battery, wherein the optimal time is a time when the battery is likely to be next used minus a period of time required to complete the charge cycle;
   determining from the usage history an optimal charge on the battery, wherein the optimal charge is a minimum charge plus an amount of energy historically used during a single use cycle; and
   initiating the charge cycle for the battery at the optimal time to the optimal charge.

2. The method of claim 1, wherein the method further comprises generating an updated usage history based on said charging.

3. The method of claim 2, wherein the method further comprises uploading the updated usage history to computer-readable media on the battery, and wherein the usage history is retrieved from the computer-readable media on the battery.

4. The method of claim 1, wherein the method further includes receiving a request to display information associated with the battery.

5. The method of claim 4, wherein the information includes one or more of the usage history and an updated usage history that is the usage history updated based on said charging.

6. The method of claim 1, wherein the usage history includes charge times, charge amounts, a start of a use period, and a conclusion of the use period.

7. The method of claim 6, wherein the usage history indicates the battery has never been charged, retrieving a first charge amount, and charging the battery to the first charge amount.

8. A smart battery charger comprising:
   a body defining one or more battery charging ports shaped to receive and hold a battery in place;
   a communications plug located within at least one of the one or more battery charging ports to communicatively couple with a communications port on the battery, thereby allowing the smart battery charger to read from and write to computer-readable memory in the battery;
   a charging plug located within the at least one of the one or more battery charging ports to conductively couple with a charging port on the battery through which an electrical current is passed to the battery; and
   a controller coupled to the communications port and the charging port, the controller executing a program that initiates a charge cycle on the battery at an optimal time to minimize a total charge on the battery over a life of the battery.

9. The smart battery charger of claim 8, further comprising a display that is communicatively coupled to the controller.

10. The smart battery charger of claim 9, further comprising a button located on the body near the one or more battery charging ports, wherein pushing the button causes information related to the battery to be displayed on the display.

11. The smart battery charger of claim 8, wherein the body defines an interior compartment sized to store one or more packages sized to ship the battery.

12. The smart battery charger of claim 8, further comprising a timing mechanism that determines a current time, wherein the timing mechanism is coupled to the controller.

13. The smart battery charger of claim 8, wherein the one or more battery charging ports are sized to receive and hold the battery that is inside a shipping box in place, and wherein the shipping box defines openings for the communications plug to couple with the communications port and the charging plug to couple with the charging port.

14. One or more computer-readable media having computer-executable instructions embodied thereon that when executed by a battery charger performs a method of scheduling charge cycles for a battery in order to minimize an average charge on the battery over a life of the battery, the method comprising:
    receiving an indication that the battery is coupled to the battery charger;
    retrieving a usage history for the battery;
    determining from the usage history an optimal time to initiate a charge cycle on the battery, wherein the optimal time is a time when the battery is likely to be next used minus a period of time required to complete the charge cycle for the battery; and
    initiating the charge cycle for the battery at the optimal time.

15. The one or more computer-readable media of claim 14, further comprising:
    determining when the battery is likely to be next used by analyzing the usage history for the battery with a machine-learning algorithm.

16. The one or more computer-readable media of claim 14, further comprising determining from the usage history an optimal charge on the battery, wherein the optimal charge is a minimum charge plus an amount of energy historically used during a single use cycle, wherein the charge cycle is terminated when the battery reaches the optimal charge.

17. The one or more computer-readable media of claim 14, wherein the battery is one of a plurality of interchangeable batteries managed by the battery charger, wherein the battery charger keeps at least one of the plurality of interchangeable batteries at full charge, thereby creating a hot battery that is available for use when usage needs deviate from historical patterns.

18. The one or more computer-readable media of claim 14, wherein the battery is one of a plurality of interchangeable batteries managed by the battery charger, and wherein the method further comprises managing use of each of the plurality of interchangeable batteries to equalize usage between batteries.

19. The one or more computer-readable media of claim 14, wherein the method further comprises displaying on a display coupled to the battery charger one or more of the time when the battery is likely to be next used, a time remaining to complete the charge cycle for the battery, an estimated number of charge cycles remaining in the life of the battery, the total energy delivered to the battery, and the anticipated energy delivery remaining in the battery.

20. The one or more computer-readable media of claim 14, wherein the method further includes receiving a request to display information associated with the battery.

\* \* \* \* \*